United States Patent [19]

Matsuo et al.

[11] 4,174,084
[45] Nov. 13, 1979

[54] DUAL PARACHUTE RIPCORD CABLE RELEASABLE CLAMP

[75] Inventors: Jon T. Matsuo, El Centro, Calif.; Ronald S. Boyum, Minneapolis, Minn.

[73] Assignee: The United States of America as represented by the Secretary of the Navy, Washington, D.C.

[21] Appl. No.: 915,499

[22] Filed: Jun. 14, 1978

Related U.S. Application Data

[63] Continuation-in-part of Ser. No. 784,107, Apr. 4, 1977, abandoned.

[51] Int. Cl.² .............................................. B64D 17/52
[52] U.S. Cl. ................................. 244/149; 244/151 A
[58] Field of Search ........................... 244/147–151 R, 244/151 A, 151 B; 248/68 R, 74 R, 74 B

[56] References Cited

U.S. PATENT DOCUMENTS

| | | | |
|---|---|---|---|
| 1,069,937 | 8/1913 | Goehst et al. | 248/74 R X |
| 2,425,033 | 8/1947 | Fletcher | 248/68 R |
| 3,087,694 | 4/1963 | Sepp, Jr. | 244/148 X |
| 3,193,223 | 7/1965 | Davis | 244/149 |
| 3,720,390 | 3/1973 | Kurle | 244/149 |

FOREIGN PATENT DOCUMENTS

669576  8/1963  Canada ................................. 244/149

Primary Examiner—Galen L. Barefoot
Attorney, Agent, or Firm—R. S. Sciascia; G. J. Rubens

[57] ABSTRACT

A clamp assembly is provided for a dual parachute release mechanism for a military personnel-type parachute which enables the automatic power cable to be in a condition to function for initiating parachute deployment, even though the manual ripcord cable and housing may have been previously released accidentally and prematurely.

7 Claims, 4 Drawing Figures

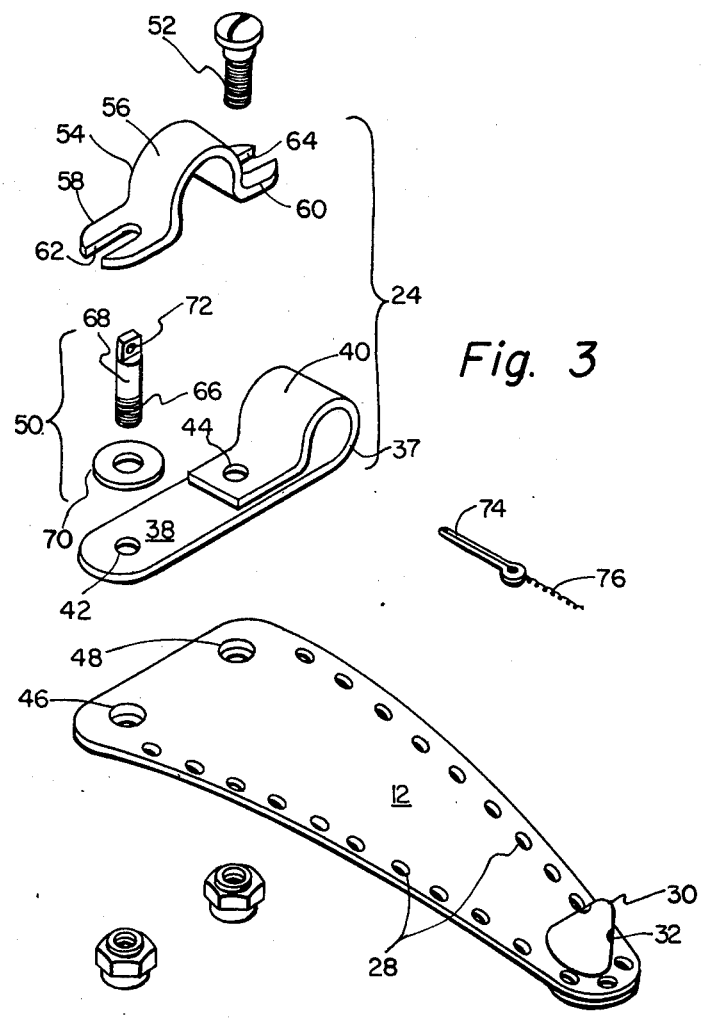

DUAL PARACHUTE RIPCORD CABLE RELEASABLE CLAMP

CROSS-REFERENCES TO RELATED APPLICATIONS

This application is a continuation-in-part of application Ser. No. 784,107 filed Apr. 4, 1977, now abandoned.

BACKGROUND OF THE INVENTION

This invention relates to military personnel-type parachute systems employing a dual manual ripcord and automatic power cable release system, and more particularly as to the manner of securing their respective housings to the exterior of the parachute container to avoid failure of the automatic power cable to initiate canopy deployment when the manual ripcord housing has been prematurely released.

Currently employed fall-away type military emergency egress parachute container assemblies use a single cable-type clamp that extends over the terminal ends of the housings of both an automatic parachute actuator power cable and a manual ripcord cable and clamps them to a conventional base plate sewn to the exterior of the parachute container.

In conventional parachutes of this type, the other end of manual ripcord housing is normally connected to the parachute harness, and the other end of the automatic cable housing is normally connected to the power actuator which is loosely supported within the parachute container. Therefore, to avoid injury to the parachutist by the trailing parachute container after canopy separation, it has been the custom to make the single prior art housing clamp releasable by a pin connected by a lanyard to a parachute harness riser strap. Unlatching the single clamp, therefore, automatically releases both the automatic power cable and manual ripcord housings simultaneously.

When such release occurs inadvertently or accidentally, it presents a serious problem in that it may prevent future operation of the automatic actuator cable to open the parachute at the designated time and altitude. This aborted condition can occur if the automatic power cable housing is not fixedly anchored to the base plate on the parachute container at the time of power initiation, as can be the situation when using the prior art clamp. Specifically, initiation of the automatic power parachute actuator, whether by pyrotechnic or mechanical device, can cause both the power ripcord cable and its housing to move together for the entire designed distance, i.e., 2 to 2½ inch, and it is possible that such movement can occur without withdrawing the ripcord pins from their respective container locking cones. Obviously in such a situation, the parachute container and the enclosed canopy will remain in a closed and secured condition, and no automatic canopy deployment will occur.

One explanation for such a malfunctioning is that the power actuator is loosely supported in the parachute container, and if the power cable housing is accidentally released by the prior art clamp, both ends of the power cable housing are free to move. Thus, when the power actuator is activated to pull on the power ripcord cable, the housing is free to be pushed toward the locking cones, nullifying the movement of the ripcord and causing the ripcord locking pins to remain connected to their respective locking cones.

SUMMARY OF THE INVENTION

An improved canopy release system is provided for personnel-type parachutes employing a dual manual ripcord and an automatic power actuator cable release mechanism which prevents malfunction of the automatic power actuator system in the event that the manual ripcord housing has been previously inadvertently released from its clamp.

The novel clamp is fabricated in two pieces, one for each manual and automatic cable housing. To enable both clamps to be secured to the base plate by the same fasteners, the clamp for the manual ripcord housing is supported on top of the clamp for the automatic cable housing in such a manner that the clamp for the former can be released at the appropriate time independently of, and without releasing, the automatic cable housing clamp.

STATEMENT OF THE OBJECTS

It is a principal object of this invention to prevent failure of an automatic parachute actuator system in the event the dual manual ripcord cable housing clamp is released prematurely.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 3 is an exploded top perspective view of the dual release clamp and base plate.

FIG. 4 is a similar view as FIG. 2 showing the manual ripcord housing and clamp having been released and separated.

DESCRIPTION OF THE PREFERRED EMBODIMENT

Figure 1:
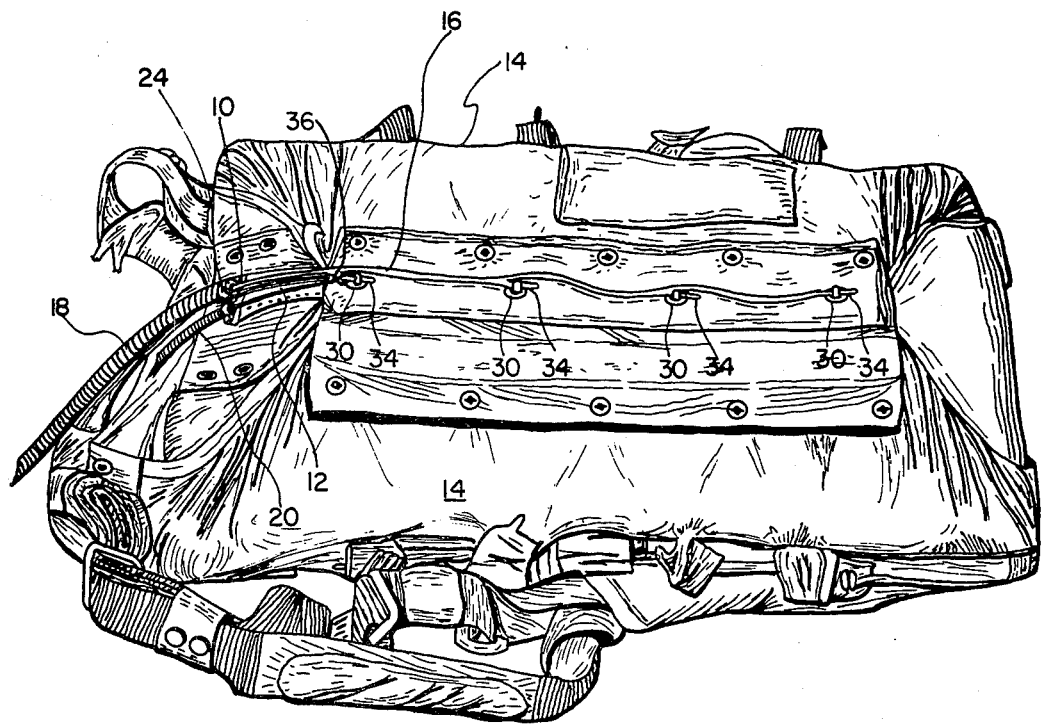
FIG. 1 is a top plan view of a typical closed parachute container showing the general arrangements of a dual cable release system.

Referring to the drawings where like reference numerals refer to similar parts, there is shown in FIG. 1 a general arrangement of a dual parachute release system 10 mounted to a triangular shaped base plate 12 of a conventional parachute container 14.

The dual parachute release system comprises a manual ripcord 16 and its housing 18, the originating end being connected in a conventional manner to a ripcord handle mounted on the parachute riser strap, not shown. An automatic power cable 20 and its housing 22 has its originating end connected in a conventional manner to a power actuator, not shown, supported within the parachute container. It should be noted that the power actuator is loosely mounted in the parachute container in a conventional manner.

Both manual and automatic cable housings 18 and 22, respectively, are secured by a novel clamp 24 to base plate 12, the latter being secured to parachute container 14 by sewing through drilled openings 28 around the periphery of the base plate. The first of a series of spaced conventional ripcord pin locking cones 30 is secured at the end of the base plate opposite clamp 24, each locking cone being provided with a transverse opening 32 to receive the respective ripcord pin 34, as shown in FIG. 1. The remaining locking cones are secured on the parachute container as shown in FIG. 1.

As shown in FIG. 1 it is conventional in this type of parachute release system for the series of ripcord pins to be mounted in spaced relation on the manual ripcord 16 in accordance with the spacing of the locking cones that are secured on the container. Automatic cable 20 is terminated in a looped end 36 through which is threaded a first ripcord pin 34 on manual ripcord 16 before the pin is inserted into its respective cone 30, as shown in FIG. 1 and in a manner well known in the art. Accordingly, a predetermined pull on either the manual ripcord or automatic cable will withdraw the ripcord pins simultaneously from their respective cones, releasing the container flaps and enabling the container to open to release the canopy.

Novel clamp 24 comprises a composite assembly of a clamp half 37 having a flat supporting section 38 and terminating at one end with a looped section 40 having a diameter snugly to receive automatic ripcord housing 22. Flat section 38 is provided with two spaced drilled openings 42 and 44 coextensive with drilled openings 46 and 48 in base plate 12, and adapted to receive bolts 50 and 52, respectively. Bolt 52 and its associated nut is designed to secure looped section 40 around automatic cable housing 22 and to base plate 12. The head of bolt 50 is separable for a purpose to be described.

Clamp half 37 described above is not intended to be releasable from base plate 12 as is the other half 54 of clamp 24. Clamp half 54 comprises a conventional cable clamp having a raised central semicircular section 56 for receiving manual ripcord housing 18, and shoulder sections 58 and 60. The shoulder sections have slotted openings 62 and 64, respectively, detachably to receive bolts 50 and 52 in a manner to be described.

Bolt 50 is fabricated with a threaded shank 66 having a smooth upper portion 68 which slidably fits through an apertured washer 70. The end of the shank opposite the threaded portion has a transverse hole 72 adapted to receive a removable cotter pin 74. Washer 70 and cotter pin 78 provides what may be called a separable nut for bolt 50. A lanyard 76 is connected at one end to cotter pin 74 and at the other end is connected to the parachute harness riser, not shown. Upon parachute deployment, tension applied to the parachute riser will cause the lanyard to withdraw cotter pin 74 which enables washer 70 to be separated freeing clamp half 56 and the manual ripcord housing 18.

Figure 2:
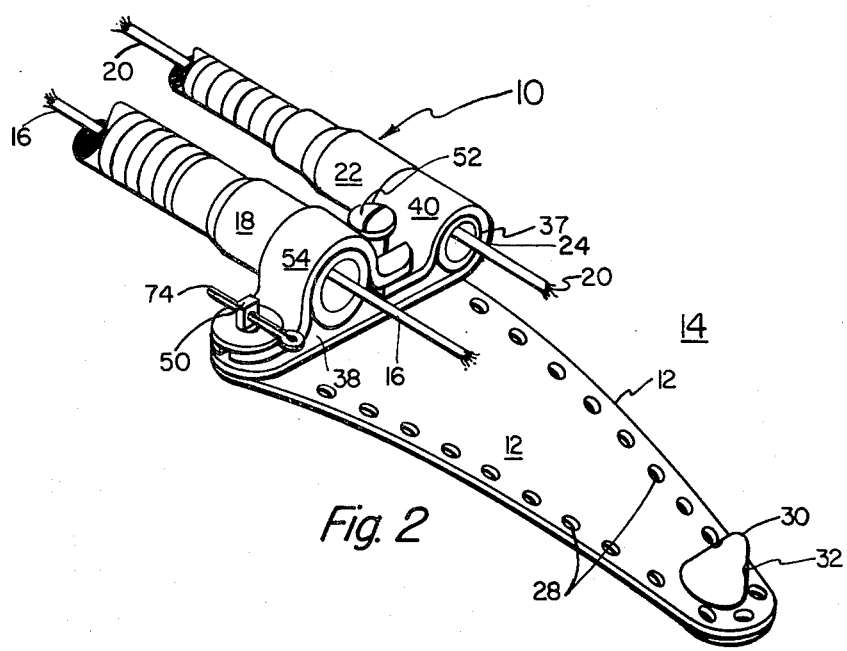
FIG. 2 is an enlarged top perspective view of the assembled dual manual ripcord and automatic power cable release housings secured to the base plate by the novel clamp of this invention.

The operation of novel clamp 24 is described with reference to FIGS. 1 to 4. In FIGS. 1 and 2, parachute release system 10 is fully assembled in a normal condition ready for operation. Under normal deployment, a pull on manual ripcord 16 will withdraw ripcord pins 34 from their respective locking cones 30 enabling the container to be opened. Subsequent release of the parachute canopy will cause the parachute risers to be extended in length applying tension on laynyard 76 to withdraw cotter pin 74. Washer 70 and bolt 50 are now free to be separated. Normal vibration and weight of the emptied parachute container will apply a tension on manual ripcord housing 18 causing washer 70 and bolt 50 to be separated, and clamp half 54 and the manual ripcord housing 18 to be pulled free from under bolt 52. It should be noted that automatic ripcord housing 22 always remains secured in place to base plate by clamp 36 and bolt 52, and is capable of automatic operation, whereas in the single piece prior art clamp the automatic ripcord housing 22 is simultaneously released along with the manual ripcord housing 18.

The operational advantage of the novel two piece clamp 24 arises whenever cotter pin 74 is accidentally withdrawn to release clamp. If in this situation, unlatching a one-piece prior art clamp 24 also causes the simultaneous release of the automatic ripcord housing 22 at the preset altitude and time delay. When the automatic parachute actuator is operated, the power cable can be pulled, approximately 2½ inches, without unlatching ripcord pins 34 from their respective locking cones.

However, according to the present invention making a two-piece separable clamp 24, only the manual clamp half is removable, and the automatic power housing remains anchored even though the manual ripcord housing is released. Thus, any tension on power cable 20 by discharge of the power actuator will ensure that the power cable housing will remain anchored to allow the ripcord pins to be withdrawn from their respective locking cones.

The advantage of the novel ripcord housing clamp is that the primary mode of parachute deployment by the automatic parachute actuator is not affected by premature and accidental release of the manual ripcord housing, providing a more safe parachute system.

Obviously many other modifications and variations of the present invention are possible in the light of the above teachings. It is therefore to be understood that within the scope of the appended claims the invention may be practiced otherwise than as specifially described.

We claim:

1. A clamping device for securing adjacent manual ripcord and automatic power cable housings to a base plate on a parachute container comprising:
   one clamp member for supporting the automatic power cable housing;
   a first means for securing said one clamp member to spaced positions on the base plate;
   a second clamp member for supporting the manual ripcord housing to the base plate;
   a second quick release means for detachably securing said second clamp member to the base plate;
   a lanyard connected between said second means and the parachute riser strap for operating said second means to detach said second clamp when a tension is applied to the strap for freeing the manual ripcord housing from the base plate whereby said automatic power cable remains clamped to the base plate when the manual ripcord housing is detached from the base plate.

2. The clamping device of claim 1 wherein said second clamp member is superimposed on top of a portion of the first clamp member.

3. The clamping device of claim 2 wherein both of said securing means are common to both clamp members.

4. The clamping device of claim 3 wherein said second clamp means is an inverted U-shaped member with each leg having a slot flange each detachably to receive one of said bolts.

5. The clamping device of claim 2 wherein the securing means comprises at least two bolts which extend through the respective ends of the two clamp members.

6. The clamping device of claim 5 wherein one of said bolts is capable of being disassembled by tension applied a lanyard connected to the parachute harness riser.

7. A clamping device for securing adjacent manual ripcord and automatic power cable housings to a base plate or a parachute container comprising:
- a first clamp member having a flat leg portion and a looped end to receive the automatic power cable housings;
- a second clamp member having a semicircular raised portion to receive the manual ripcord housing and having shoulders having slotted ends;
- a pair of bolts extending through said flat leg portion of the first clamp member and the slotted shoulder ends of the second clamp member;
- one of said bolts having a separable nut capable of being disassembled when a tension is applied to the parachute harness riser;
- whereby the second clamp member may be separated from the first clamp member to release the manual ripcord housing without releasing the first clamp securing the power cable housing.

* * * * *